E. H. LAMIELL.
CULTIVATOR.
APPLICATION FILED OCT. 6, 1919.
1,376,344.
Patented Apr. 26, 1921.
2 SHEETS—SHEET 1.
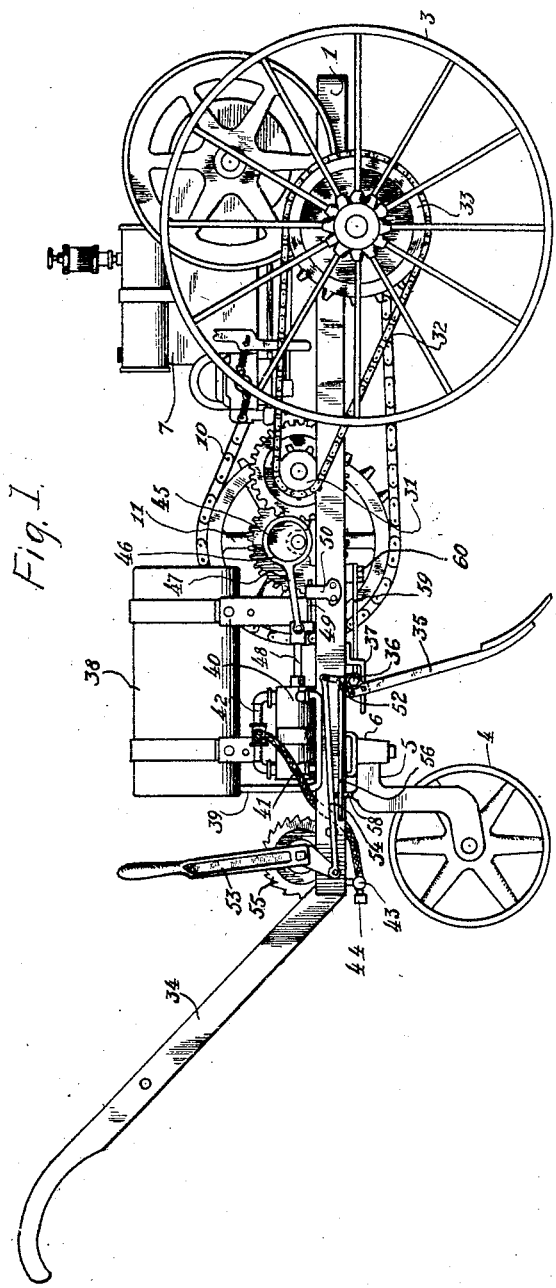
INVENTOR
Earld H. Lamiell.
BY Freese, Merkel, Saywell and Bond
ATTYS

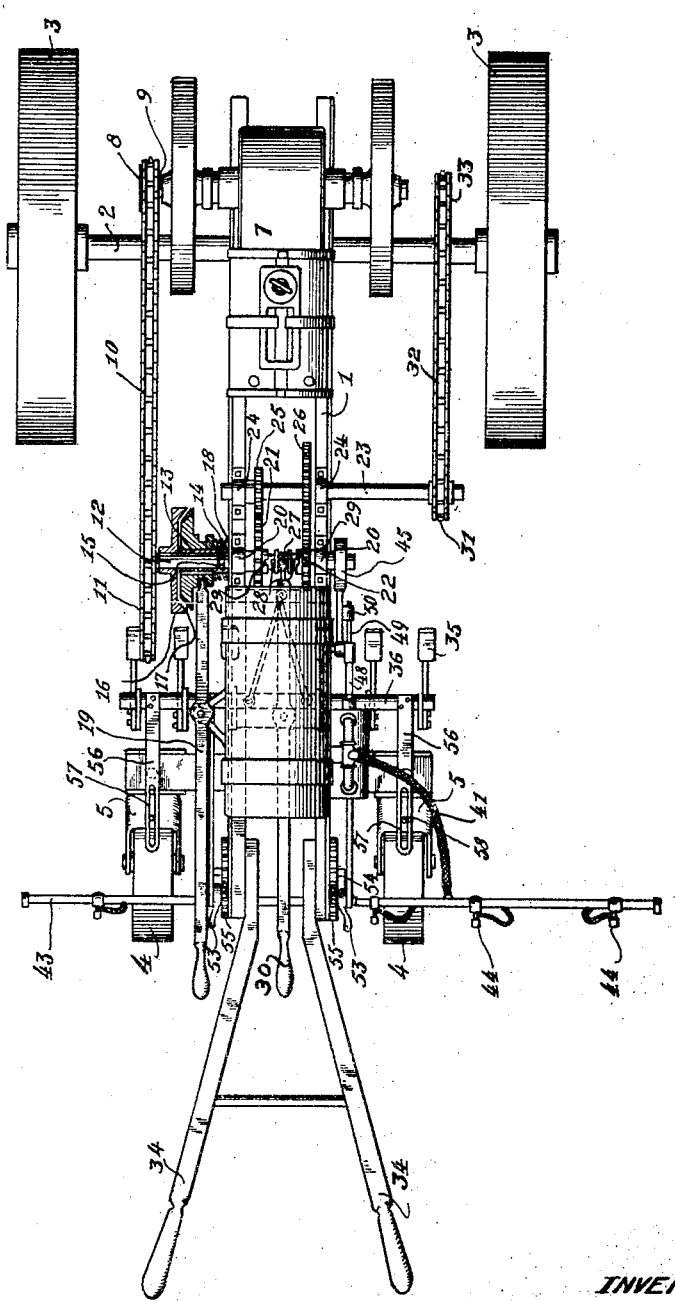

UNITED STATES PATENT OFFICE.

EARLD H. LAMIELL, OF GREENWICH, OHIO.

CULTIVATOR.

1,376,344.  Specification of Letters Patent.  Patented Apr. 26, 1921.

Application filed October 6, 1919. Serial No. 328,711.

*To all whom it may concern:*

Be it known that I, EARLD H. LAMIELL, a citizen of the United States, residing at Greenwich, in the county of Huron and State of Ohio, have invented a Cultivator, of which the following is a specification.

This invention relates to cultivators and has more especial reference to a wheeled frame provided with a cultivator and a sprayer and arranged to spray and cultivate the plants in a single operation and arranged to hold the cultivator in proper alinement when the wheeled frame is turned toward either side.

The objects of the invention are to provide a wheeled frame having means for attaching a cultivator of any usual and well known construction, and provided with a sprayer operated by a pump actuated by the traction motor, to provide means whereby the cultivating and spraying are done simultaneously; to provide means for holding the cultivator in proper alinement when the wheeled frame is turned toward either side; and to generally improve constructions of this character.

With these objects in view the invention consists in the novel construction and arrangement of parts, hereinafter described, illustrated in the accompanying drawings, and particularly pointed out in the appended claims, it being understood that various changes in the form, proportions, size and minor details of construction may be made within the scope of the appended claims, without departing from the spirit or sacrificing any of the advantages of the invention.

The invention thus set forth in general terms is illustrated in the accompanying drawings forming part hereof, in which—

Figure 1 is a side elevation of a device embodying the invention; and

Fig. 2 is a plan view of the same, parts being broken away for the purpose of illustration.

A practical embodiment of the invention is disclosed in the accompanying drawings, forming a part of this specification in which similar numerals of reference indicate corresponding parts throughout the several views.

The frame 1 of the tractor is provided at its forward end with suitable bearings within which is journaled the front axle 2, the traction wheels 3 being fixedly mounted upon said axle.

The rear wheels 4 are relatively smaller and are of what might be termed the caster type, each of these wheels being mounted independently within a yoke 5, which is pivoted at 6 to the rear portion of the tractor frame.

The motor 7 is mounted upon the forward end of the tractor frame and a sprocket 8 is mounted upon the engine shaft 9, the chain 10 connecting said sprocket with a relatively large sprocket 11 mounted upon the shaft 12. The shaft 12 is journaled within the tubular shaft 13, a set screw 14 being located through said tubular shaft and engaging the annular groove 15 in the shaft 12 to prevent the chain from becoming displaced.

The cup shaped clutch member 16 is keyed upon the shaft 12 and the conical clutch member 17 is keyed upon the tubular shaft 13 and slidable longitudinally thereon, the spring 18 tending to normally urge the conical clutch member 17 into engagement with the cup shaped clutch member 16. The clutch member 17 is operated by the lever 19 pivoted upon the frame.

The shaft 13 is journaled in suitable bearings 20 carried upon the frame 1 and has loosely mounted thereon the large gear 21 and the small gear 22, these gears being spaced from each other. A counter-shaft 23 is journaled in the bearings 24 upon the frame and has fixedly mounted thereon a small gear 25 which meshes with the gear 21 and a large gear 26 which meshes with the gear 22.

A sleeve 27 is slidably keyed upon the shaft 13 and is provided with longitudinally disposed lugs 28 arranged to mesh with the sockets 29 formed in the gears 21 and 22, a lever 30 being pivoted upon the frame and arranged to throw this sleeve into engagement with either the gear 21 or 22 for the purpose of coupling said gears to the shaft.

The shaft 23 is provided with a sprocket wheel 31, a chain 32 connecting said sprocket with the relatively large sprocket 32 mounted upon the front axle 2 of the tractor. With this construction the traction wheels 3 are driven either at high or low speed by the engine 7.

A pair of handles 34 are connected to the rear end of the frame 1 and are properly located to be grasped by the operator. A cultivator of any usual and well known construction is indicated by the numeral 35, this cultivator being carried upon the rock shaft 36 which is slidably mounted upon the brackets 37, mounted upon the frame 1. A rock arm 52 is fixed upon the rock shaft and connected with the lever 53 by means of a link 54. The lever 53 coöperates with a ratchet 55 and is arranged to raise or lower the blades of the cultivator and hold them at any desired elevation.

The rock shaft 36 has fixedly connected thereto a pair of rearwardly disposed bars 56 provided with elongated slots 57 which engage pins 58 carried upon the brackets 5 of the casters 4. The shaft 36 is provided with a U-frame 59 pivotally connected to the frame 1 at 60.

With this construction, when the tractor is turned toward either side, the cultivator will be kept in the furrows, the slotted bars 56 coöperating with the caster brackets oscillating the cultivator frame, allowing the rock shaft 36 to swing within the brackets 37 sufficiently to retain the cultivator in the proper angle until the tractor is again brought back into its original path.

A tank 38 is mounted upon the frame 1 toward the rear end thereof and is connected by a pipe 39 with the pump 40, a hose 41 being connected to the outlet pipe 42 of the pump. The spray boom 43 is mounted above the cultivator transversely of the frame 1 and may be of any usual and well known construction being provided with a plurality of nozzles 44. The hose 41 connects the outlet pipe 42 of the pump with the spray boom. An eccentric 45 is mounted upon the outer extremity of the shaft 13 and is surrounded by the band 46 to which is connected the arm 47, said arm being pivotally connected at its extremities to the piston rod 48 of the pump. For the purpose of causing the piston rod 48 to travel in a horizontal plane, the guide rod 49 is mounted upon the end of the piston rod and arranged to reciprocate within the bar 50 mounted within the frame, thus preventing the ends of the piston rod from being moved up or down by the action of the eccentric 45.

It should be noted that the pump which operates the sprayer is driven by the same means which propels the tractor and that the clutch 17 which controls the movement of the tractor also controls the operation of the pump. By this construction the sprayer is operated at all times during the operation of the tractor and automatically cut-off when the tractor is stopped.

It should be understood that the tank 38 is filled with any desired spraying solution, the solution varying according to the plants which are being sprayed or the disease or insect which is attacking the plants. By combining the cultivator and the sprayer the solution is sprayed upon the plants at the same time that the cultivator is passing between the rows of plants, naturally agitating the plants and allowing the solution to be sprayed upon every part of the plants. Further the solution will be more effective against any insects or diseases attacking the roots of the plants as the solution is sprayed around the roots of the plants at the same time that the cultivator is agitating the earth around the roots, thus allowing the solution to reach any disease or insects in the ground or roots of the plants.

Although the drawings and above specification disclose the best mode in which I have contemplated embodying my invention I desire to be not limited to the details of such disclosure, for, in the further practical application of my invention, many changes in form and construction may be made, as circumstances require or experience suggests, without departing from the spirit of the invention, within the scope of the appended claims.

I claim:

1. In combination with a wheeled frame of the character described, a cultivator pivotally mounted thereon, pivoted casters, and means between the cultivator and casters for holding the cultivator in proper alinement when the wheeled frame is turned toward either side.

2. In combination with a wheeled frame of the character described, a cultivator pivotally mounted thereon, pivoted casters, pins upon said casters and slotted members connected to the cultivator and engaging the pins for holding the cultivator in proper alinement when the tractor is turned toward either side.

3. In combination with a wheeled frame of the character described, a rock shaft pivotally mounted thereon and provided with a cultivator, pivoted casters carried by the rear portion of the frame, a pin mounted on each caster and slotted bars fixedly mounted upon the rock bar and engaging said pins for holding the rock bar in proper alinement when the wheeled frame is turned toward either side.

In testimony that I claim the above, I have hereunto subscribed my name.

EARLD H. LAMIELL.